Wm. T. Eastes
Imp. in Churns.
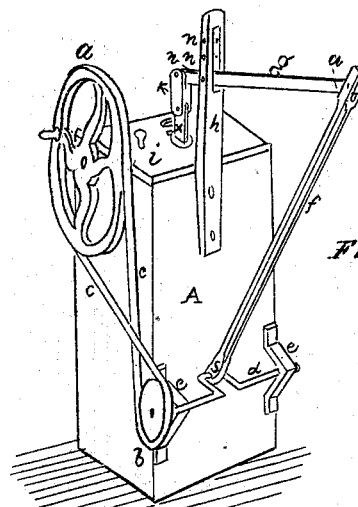
Fig. 1.
71469
PATENTED
NOV 26 1867
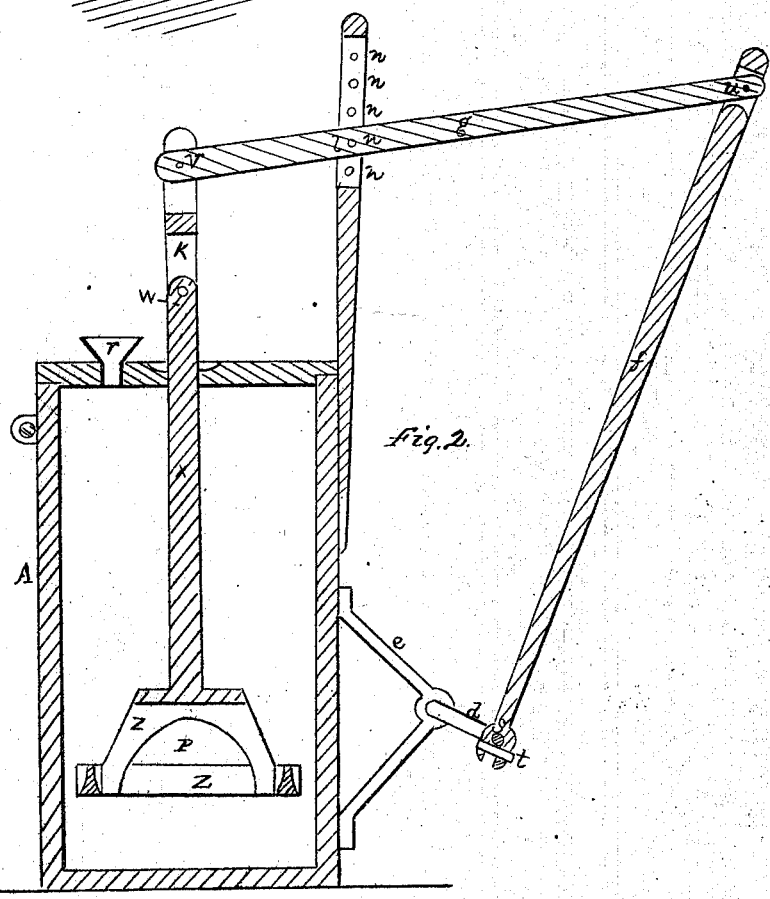
Witnesses
J. Hardesty
R. K. Evans
Inventor
Wm. T. Eastes
by his Attorney A. H. Evans

United States Patent Office.

WILLIAM T. EASTES, OF MADISON COUNTY, INDIANA.

Letters Patent No. 71,469, dated November 26, 1867.

IMPROVEMENT IN CHURNS.

The Schedule referred to in these Letters Patent and making part of the same.

TO ALL WHOM IT MAY CONCERN:

Be it known that I, WILLIAM T. EASTES, a citizen of Madison county, and State of Indiana, have invented a new and useful Improvement on a Churn; and I do hereby declare that the following is a full, clear, and exact description of the construction and operation of the same, reference being had to the annexed drawings, making a part of this specification, in which—

Figure 1 is a perspective view,
Figure 2 a sectional view, and
Figure 3 the sides of the dasher not shown in fig. 2.

The nature of my invention consists in providing the churn with a dasher, which from its peculiar shape will pass readily through the milk or cream, and carry the air through the same. This dash is worked by a crank, as set forth.

To enable others skilled in the art to make and use my invention, I will proceed to describe its construction and operation.

A represents the churn, $a$ and $b$ the driving-wheels, with their connecting-band $c$. $d$ is the crank, secured in braces $e\ e$; and attached to rod $f$ works the lever $g$, and thus produces the motion in the dash $z$, through the jointed arm $k\ x$. The rod $f$ is secured to the crank $d$ by the pin $t$, at $s$, and to the lever $g$ by the pin $u$. The lever $g$ works on the pin $l$, at $n$, and this may be raised or lowered to suit the position of the dasher to the quantity of cream in the churn. The lever is attached to the jointed arm $k\ x$, jointed at $w$, by the pin $v$. When the dash is to be put in or taken out of the churn, the pins $l$ and $w$ are to be drawn out, and this allows the lever to pass from over the churn. $r$ is an air-hole on the top of the churn. P represents the side view of my improved dash, and O the end view of the same, and from the peculiar shape it is easily pressed down through the cream or raised again. Also, by a short alternate motion of the wheel, this dash, if kept near the bottom, will gather the butter and throw it to the top.

What I claim as my invention, and desire to secure by Letters Patent, is—

The dash $z$, substantially as and for the purpose set forth, in combination with the crank $d$, the rod $f$, the lever $g$, and the jointed arm $k\ x$, all connected substantially as described.

WILLIAM T. EASTES.

Witnesses:
JOSEPHINE E. WILLIAMS,
MATILDA WILLIAMS.